US011334925B1

(12) United States Patent
Todd et al.

(10) Patent No.: US 11,334,925 B1
(45) Date of Patent: May 17, 2022

(54) NORMALIZATION AND SECURE STORAGE OF ASSET VALUATION INFORMATION

(71) Applicant: EMC IP Holding Company LLC, Hopkinton, MA (US)

(72) Inventors: Stephen J. Todd, Shrewsbury, MA (US); Jeffrey Norton, Laguna Niguel, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 568 days.

(21) Appl. No.: 15/907,705

(22) Filed: Feb. 28, 2018

(51) Int. Cl.
*G06F 16/27* (2019.01)
*G06Q 30/02* (2012.01)
*G06Q 10/06* (2012.01)

(52) U.S. Cl.
CPC ......... *G06Q 30/0278* (2013.01); *G06F 16/27* (2019.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 7,970,684 B1* | 6/2011 | Benda | ..................... | G06Q 40/06 705/36 R |
| 9,892,460 B1* | 2/2018 | Winklevoss | ............ | G06Q 40/04 |
| 2008/0288419 A1* | 11/2008 | Miles | ....................... | G06Q 40/06 705/36 R |
| 2009/0043637 A1* | 2/2009 | Eder | ....................... | G06N 7/005 705/35 |
| 2015/0213444 A1* | 7/2015 | McEntee | ................. | G06F 16/83 705/44 |
| 2018/0268506 A1* | 9/2018 | Wodetzki | ............... | G06K 9/628 |
| 2019/0253256 A1* | 8/2019 | Saab | ..................... | H04L 9/0637 |
| 2020/0184556 A1* | 6/2020 | Cella | ................... | G06Q 40/025 |

OTHER PUBLICATIONS

Doug Laney, "The Economics of Information Assets," The Center for Infonomics, Smarter Companies presentation, Sep. 2011.
Satoshi Nakamoto, "Bitcoin: A Peer-to-Peer Electronic Cash System," www.bitcoin.org, 2008.

(Continued)

*Primary Examiner* — William J Jacob
(74) *Attorney, Agent, or Firm* — Ryan, Mason & Lewis, LLP

(57) ABSTRACT

Techniques are disclosed for normalized asset valuation and secure storage of information associated with such normalized asset valuation. In one example, a method obtains two or more asset valuation models for a given asset, wherein at least two of the two or more asset valuation models are generated using different asset valuation algorithms, and then converts one or more values in each of the two or more asset valuation models into a common valuation form such that the two or more asset valuation models are converted into two or more normalized valuation models. The common valuation form may be in the form of a cryptocurrency. The method may also combine the two or more normalized valuation models to form a single normalized valuation for the given asset. Still further, the method may store valuation information associated with the converting step in a secure storage system, e.g., a distributed ledger system.

20 Claims, 10 Drawing Sheets

(56) References Cited

OTHER PUBLICATIONS

U.S. Appl. No. 14/863,783, filed in the name of Stephen Todd et al. filed Sep. 24, 2015 and entitled "Unstructured Data Valuation."
U.S. Appl. No. 14/998,112, filed in the name of Stephen Todd et al. filed Dec. 24, 2015 and entitled "Data Valuation Based on Development and Deployment Velocity."
U.S. Appl. No. 15/135,790, filed in the name of Stephen Todd et al. filed Apr. 22, 2016 and entitled "Data Valuation at Content Ingest."
U.S. Appl. No. 15/135,817, filed in the name of Stephen Todd et al. filed Apr. 22, 2016 and entitled "Data Value Structures."
U.S. Appl. No. 15/136,327, filed in the name of Stephen Todd et al. filed Apr. 22, 2016 and entitled "Calculating Data Value via Data Protection Analytics."
U.S. Appl. No. 15/669,523, filed in the name of Stephen Todd et al. filed Aug. 4, 2017 and entitled "Calculating Asset Value Using Multi-Dimensional Models."
U.S. Appl. No. 15/797,663, filed in the name of Stephen Todd et al. filed Oct. 30, 2017 and entitled "Content Storage Management Based on Multi-Dimensional Valuation Models."
U.S. Appl. No. 15/487,684, filed in the name of Stephen Todd et al. filed Apr. 14, 2017 and entitled "Analytics Attestation Via Secure Data Chain Network."

\* cited by examiner

NORMALIZATION AND SECURE STORAGE OF ASSET VALUATION INFORMATION

FIELD

The field relates generally to data processing and, more particularly, to asset valuation.

BACKGROUND

Valuation algorithms allow owners and/or users of content to associate economic or business value to their assets (e.g., data, applications, services, etc.). This value can then potentially be used as input to a variety of business functions, e.g., content storage, content leveraging, etc. However, there are multiple types of valuation algorithms that can be employed to value an asset. As such, content owners/users may not be able to accurately evaluate the value of the asset given different valuation results.

SUMMARY

Embodiments of the invention provide techniques for normalized asset valuation and secure storage of information associated with such normalized asset valuation.

For example, in one embodiment, a method performed by one or more processing devices comprises the following steps. The method obtains two or more asset valuation models for a given asset, wherein at least two of the two or more asset valuation models are generated using different asset valuation algorithms, and then converts one or more values in each of the two or more asset valuation models into a common valuation form such that the two or more asset valuation models are converted into two or more normalized valuation models.

In further illustrative embodiments, the common valuation form is in the form of a cryptocurrency. The method may also combine the two or more normalized valuation models to form a single normalized valuation for the given asset. Still further, the method may store valuation information associated with the converting step in a secure storage system, e.g., a distributed ledger system.

Advantageously, illustrative embodiments provide techniques for balancing of data assets across an enterprise portfolio. For example, the value represented by the valuation models can be normalized into cryptocurrencies across an organization and then used to trigger data actions based on the results.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "information processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" illustratively refers to a computation and/or estimation of something's worth or value; in this case, data valuation is a computation and/or estimation of the value of a data set for a given context;

"context" illustratively refers to surroundings, circumstances, environment, background, settings, characteristics, qualities, attributes, descriptions, and/or the like, that determine, specify, and/or clarify something; in this case, for example, context is used to determine a value of data;

"structured data" illustratively refers to data that resides in fixed fields within a document, record or file, e.g., data contained in relational databases and spreadsheets; and "unstructured data" illustratively refers to data that is not considered structured data (in which case, some "semi-structured" data asset may also be considered unstructured data), e.g., documents, free form text, images, etc.;

"metadata" illustratively refers to data that describes other data;

"enterprise" illustratively refers to a business, a company, a venture, an entity, or the like; and "entity" illustratively refers to one or more persons, one or more systems, or combinations thereof.

It is to be appreciated that while illustrative embodiments describe asset valuation from the perspective of data sets, i.e., data valuation, other assets (e.g., applications, services, etc.) can be valued using these techniques.

Figure 1:
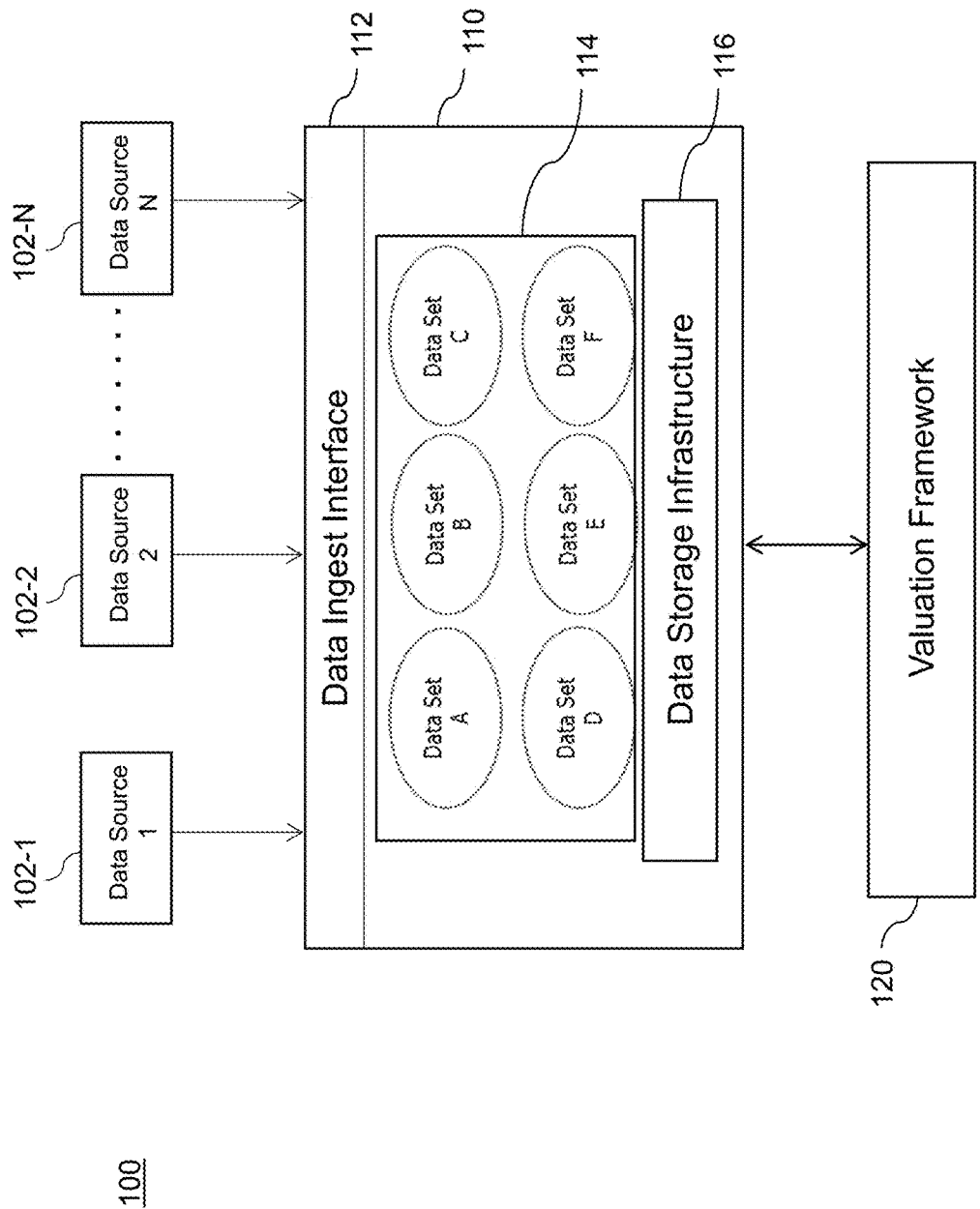
FIG. 1 illustrates a data storage system environment with a data valuation framework with which one or more illustrative embodiments can be implemented.

FIG. 1 illustrates a data storage system environment in which asset valuation can be implemented. As shown, in data storage system environment 100 (which may be implemented as a cloud computing platform in an illustrative embodiment), data sources 102-1, 102-2, . . . , 102-N provide data to data storage system 110 through a data ingest interface 112. In illustrative embodiments, one or more of the data sources 102-1, 102-2, . . . , 102-N may provide streaming data (i.e., data streams). However, one or more of the data sources 102-1, 102-2, . . . , 102-N may also provide non-streaming data. The data storage system 110 comprises a plurality of data sets 114 (data sets A-F) that are stored on resources associated with data storage infrastructure 116. The data sets 114 comprise the data from the data sources 102 (e.g., data files), but can also include other data. The data sets 114 may each have their own domain-specific data (e.g., customer data, employment data, credit data, etc.) corresponding to one or more of data sources 102-1, 102-2, . . . , 102-N.

Data storage infrastructure 116 may comprise resources such as one or more compute elements (e.g., servers), network elements (e.g., switches, routers), and storage elements (e.g., storage devices, storage arrays). Data storage system 110 can be part of one or more data centers managed by one or more service providers (e.g., one or more public clouds), one or more data centers privately managed by an enterprise (e.g., one or more private clouds), or some combination thereof. Also note that while data storage infrastructure 116 is illustrated as a single storage component in FIG. 1 within which data sets 114 are stored, it is to be understood that the data storage infrastructure 116 may be geographically distributed or otherwise distributed such that all the data sets 114 are duplicated on multiple storage infrastructure or the data sets 114 are separately distributed on multiple storage infrastructure.

The value of data, such as the data from data sources 102-1, 102-2, . . . , 102-N stored as data sets 114, is calculated by valuation framework 120. Illustrative embodiments calculate data valuation metrics for the data sets 114 utilizing one or more data valuation algorithms.

It is realized that there are many different algorithms that can be used to value an asset such as a data set. Examples of data valuation algorithms that may be employed to compute data valuation may comprise, but are not limited to:

(i) unstructured tokenization algorithms (UTA) described in U.S. patent application Ser. No. 14/863,783, filed Sep. 24, 2015, entitled "Unstructured Data Valuation," the disclosure of which is incorporated herein in its entirety;

(ii) application development and deployment velocity valuation algorithms described in U.S. patent application Ser. No. 14/998,112, filed Dec. 24, 2015, entitled "Data Valuation Based on Development and Deployment Velocity," the disclosure of which is incorporated herein in its entirety;

(iii) data ingest valuation algorithms described in U.S. patent application Ser. No. 15/135,790, filed Apr. 22, 2016, entitled "Data Valuation at Content Ingest," the disclosure of which is incorporated herein in its entirety;

(iv) data value tree generation techniques described in U.S. patent application Ser. No. 15/135,817, filed Apr. 22, 2016, entitled "Data Value Structures," the disclosure of which is incorporated herein in its entirety; and (v) valuation algorithms based on analysis of a backup and recovery ecosystem described in U.S. patent application Ser. No. 15/136,327, filed Apr. 22, 2016, entitled "Calculating Data Value via Data Protection Analytics," the disclosure of which is incorporated herein in its entirety.

By way of another non-limiting example, one or more of the data valuation models described in D. Laney, "The Economics of Information Assets," The Center for Infonomics, Smarter Companies presentation, September 2011, may be employed as data valuation algorithms. Such valuation models include a set of non-financial models and set of financial models. As shown, the non-financial models include: (i) an intrinsic value of information (IVI) model, which represents a measure of a value of the correctness, completeness, and exclusivity (scarcity) of the data set; (ii) a business value of information (BVI) model, which represents a measure of a value of the sufficiency and relevance of the data set for specific purposes; and (iii) a performance value of information (PVI) model, which represents a measure of a value of how the data set affects key business drivers. The financial models include: (i) a cost value of information (CVI) model, which represents a measure of a value of the cost of losing the data set; (ii) a market value of information (MVI) model, which represents a measure of a value of the amount that could be obtained by selling or trading the data set; and (iii) an economic value of information (EVI) model, which represents a measure of a value of how the data set contributes to a financial bottom line.

In general, valuation approaches have proposed calculating the total value of a data set based on a single-value evaluation of the data set, which yields a single cost value. However, when considering various functional uses of data (e.g., backup, enterprise planning, discovery, etc.) or use by different organizations (within the enterprise or even multiple enterprises), it has been realized that such an approach may inhibit an ability to treat each of these groups (e.g., functional uses, different organizations, etc.) separately. As a result, cross-enterprise costs may not be accurately taken into account in existing single cost valuation approaches.

An approach to accurately consider such cross-enterprise costs has been proposed. For example, such an approach is described in U.S. patent application Ser. No. 15/669,523, entitled "Calculating Asset Value Using Multi-Dimensional Models" filed Aug. 4, 2017, the disclosure of which is incorporated by reference herein in its entirety. More particularly, the above-referenced U.S. Patent Application describes an approach whereby the value of a data asset is calculated by creating a cross-enterprise view of the data's value and cost. This view is expressed in the form of a multi-dimensional model, e.g., a matrix. Many different business processes can be performed using the multi-dimensional model approach including, but not limited to, determining where a data asset should be stored, see, e.g., U.S. patent application Ser. No. 15/797,663, entitled "Content Storage Management Based on Multi-Dimensional Valuation Models" filed Oct. 30, 2017, the disclosure of which is incorporated by reference herein in its entirety.

More particularly, the multi-dimensional model approach introduces matrix equations to model data value across, e.g., multiple enterprises, organizations, multiple functions, multiple locations, multiple individuals, etc. (which are more generally referred to herein as "groups"). These groups may, for example, represent different organizations or functions within an enterprise. However, the groups can also refer to different storage locations such as, for example, when data is stored in different clouds or different data centers. As mentioned above, modeling data value with a single-value equation does not capture the cost of communication and dependencies between groups within an enterprise. However, as will be further explained, illustrative embodiments use matrix equations to more accurately reflect these costs.

Casting valuation equations as matrix equations assists in capturing cross-group costs. A matrix is a rectangular array of numbers which, in illustrative embodiments, is used to represent a system of equations. Advantageously, existing single-value equations can be re-cast as matrices as follows.

A single-value equation can represent the data valuation to one organization as:

$$ax = \text{Value}$$

where a is a weighting factor and x is the valuing variable of interest. Value is the total value due to the valuing variable.

In contrast, a multi-dimensional or matrix equation for two groups in the organization, where the value to each of the two groups is completely independent, is as follows:

$$\begin{bmatrix} a_{11} & 0 \\ 0 & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

The weighting factors have essentially become coefficients in the matrix which when written as value equations for organizations 1 and 2 appear as follows:

$$a_{11} x_1 = \text{Value}_1 \quad \text{(Eq. 1)}$$

$$a_{22} x_2 = \text{Value}_2 \quad \text{(Eq. 2)}$$

Illustrative embodiments use off-diagonal entries to reflect inter-group impact.

In one example, assume that there is a cost for transferring or sharing data between organizations 1 and 2. Illustrative embodiments account for these costs with the off-diagonal entries $a_{12}$ and $a_{21}$ in the matrix below:

$$\begin{bmatrix} a_{11} & a_{12} \\ a_{21} & a_{22} \end{bmatrix} \begin{Bmatrix} x_1 \\ x_2 \end{Bmatrix} = \begin{Bmatrix} \text{Value}_1 \\ \text{Value}_2 \end{Bmatrix}$$

which when written out as value equations for the organizations becomes:

$$a_{11} x_1 + a_{12} x_2 = \text{Value}_1 \quad \text{(Eq. 3)}$$

$$a_{22} x_2 + a_{21} x_1 = \text{Value}_2 \quad \text{(Eq. 4)}$$

Note that entries $a_{12}$ and $a_{21}$ can essentially represent negative values that would therefore negatively impact the equation values for organization 1 and 2 shown above as Eq. 1 and Eq. 2, respectively.

In other words, for existing single-value models, the single value is offset by any associated cross-organizational cost.

For simplicity, the matrix equation can be written as:

$$A\bar{x} = \overline{\text{Value}}$$

where the bolded letter represents a matrix and all other values represent scalars.

As indicated above, the cost to a group (for example, an organization in the enterprise) is represented by a row in the matrix equation.

More particularly, the left-to-right diagonal ($a_{11}$ and $a_{22}$) may represent (positive) value to the organization that can directly access that data, while the right-to-left diagonal ($a_{12}$ and $a_{21}$) may represent the costs incurred in order for another organization to leverage value out of that data. By subtracting these costs from the aggregate value on the left-to-right axis, an overall valuation score is calculated.

The matrix can be arbitrarily large, so many different organizations and functions (i.e., groups) may be represented. Further, if two organizations experience different costs based on the direction (flow) of the data between organizations, these can be reflected by using non-symmetric matrices. By the term "non-symmetric matrix" as illustratively used herein (or asymmetric matrix), it is intended to describe the asymmetry in the costing that the matrices, according to illustrative embodiments, are able to reflect or capture.

Figure 2:
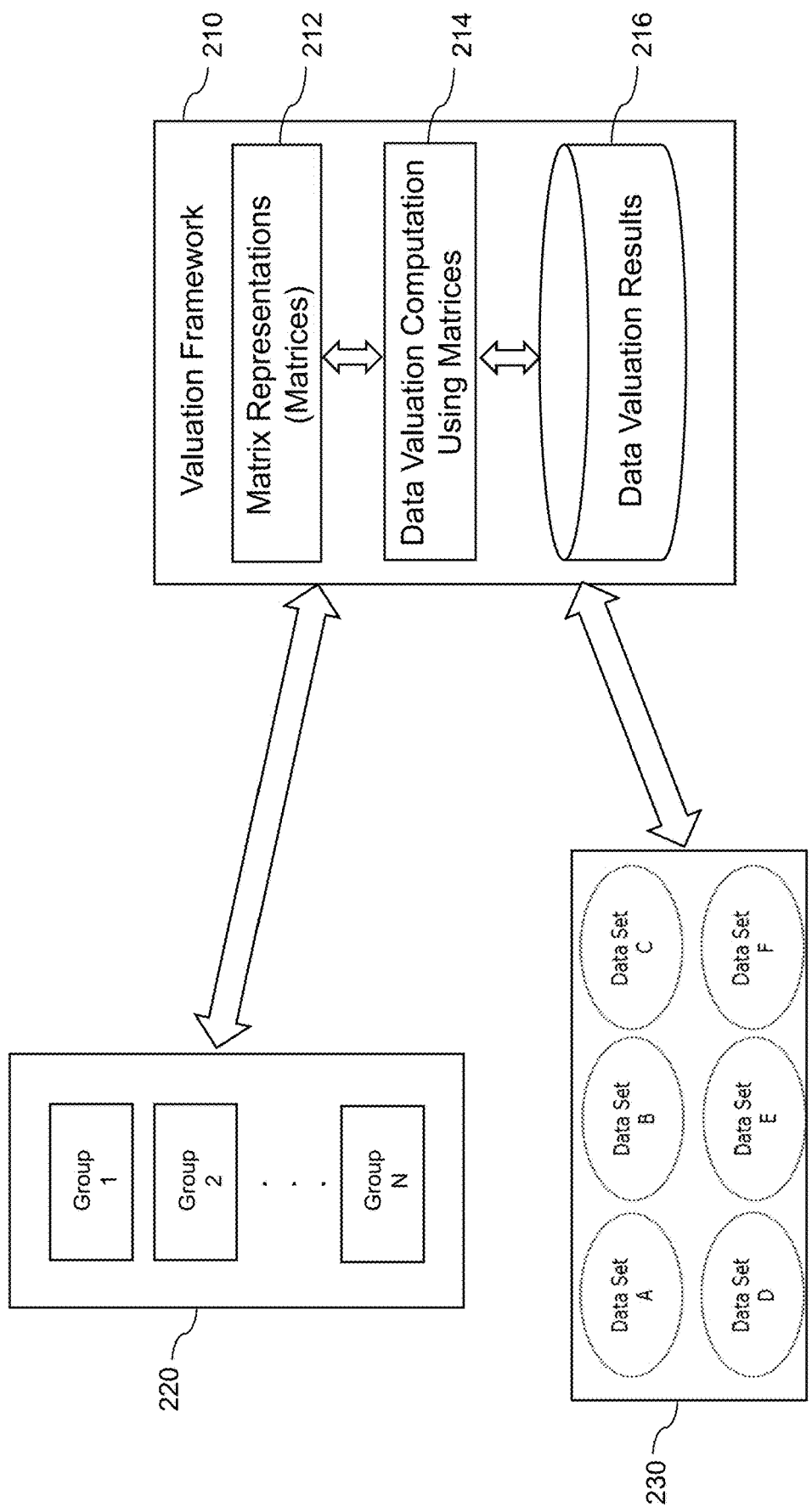
FIG. 2 illustrates a data valuation framework using multi-dimensional model functionality with which one or more illustrative embodiments can be implemented.

FIG. 2 illustrates a valuation framework 210 using multi-dimensional model functionality. Framework 210 is an example of framework 120 shown in FIG. 1. As shown, data valuation framework 210 comprises matrix representations (matrices or matrix data structures) 212 which are used in data valuation computations 214 to generate data valuation results 216. Advantageously, as explained above, data valuation framework 210 takes into account the set of groups 220 (Group 1, Group 2, . . . , Group N) when performing data valuation of data sets 230 (e.g., data sets A-F of FIG. 1). That is, the matrices 212 model data value for each of data sets 230 across multiple groups 220 (e.g., organizations, functions, storage locations, etc.). Then, data valuation computation 214 generates values using the corresponding matrix for a given data set that reflects the inter-group impact (i.e., cross-group impact values). The data valuation results 216 may be stored in a form that allows an administrator or other party or system to view the multiple dimensions of the value calculation for a data set for each group. For example, recall Eq. 3 above. As applied to the example in FIG. 2, $a_{11}x_1$ can reflect the value of Data Set A for Group 1, while $a_{12}x_1$ reflects the impact of Group 2 as it relates to Group 1 for Data Set A (i.e., a cross-group impact value or sub-computation). Each of these sub-computations ($a_{11}x_1$ and $a_{12}x_1$) can be stored as values in the data valuation results 216, as well as the total of these sub-components as a total value. Recall that Group 2 may have a negative impact on Data Set A as it relates to Group 1 and thus the second sub-computation $a_{12}x_1$ would be subtracted from the first sub-computation. However, alternatively, the impact could be positive and thus the sub-computations would be added. Nonetheless, when the impact is negative (e.g., $a_{12}$ is negative), the sub-computations can still be considered as being added (since adding a value with a negative coefficient is equivalent to subtracting).

In another illustrative embodiment, the coefficients $a_{ii}$ may be considered as constant (or at least more constant than the x values). Thus, in this embodiment, the system stores the coefficients $a_{ii}$ and then multiplies them with their corresponding x values and sums everything to get the different valuations. In one example, a computer instruction serves to multiply and sum coefficients and values in one iteration. Thus, the system stores the coefficients $a_{ii}$, feeds in x values, and the multiply and sum operation is performed to obtain the valuations.

In a further embodiment, the coefficients $a_{ii}$ may be considered as time-dependent over a longer period of time (e.g., months) as compared with the x values which can change from instant to instant. Thus, the coefficients $a_{ii}$ can be initially stored as constants, but then underlying tools for developing the coefficients can be re-executed (e.g., a valuation analysis, an analysis of latency of the network, etc.) on a periodic basis (e.g., monthly or quarterly schedule) in order to update the coefficients.

It is to be appreciated that the size of a matrix is essentially tied to the number of organizations within a company. For example, a large company, e.g., Company 1, may have multiple companies (e.g., subsidiaries or otherwise) organizationally beneath it, Sub-Company 1, Sub-Company 2, . . . , Sub-Company N. Furthermore, within each sub-company there may be a certain number of departments. Advantageously, all of these organizations (e.g., sub-companies, sub-departments, etc.) can be modeled within a relatively small matrix. Such data valuation-based multi-dimensional model functionality enables modeling massive amounts of data assets (e.g., files, databases, objects, etc.) with such valuation matrices.

Figure 3:
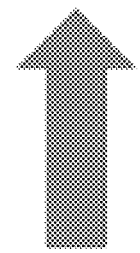
FIG. 3 illustrates an example of a file valuation represented in a multi-dimensional model form with which one or more illustrative embodiments can be implemented.

By way of example, FIG. 3 illustrates an example 300 of a file valuation represented in multi-dimensional model form. More particularly, FIG. 3 shows that for any given data set 302 (File D), the value of the data set 302 can be expressed as a matrix 304 (computed as illustratively explained above) which takes into account cross-organizational costs. In this case, the left-to-right diagonal represents the value of data, expressed using the above-referenced BVI model, to each of six organizations (ORG1, ORG2, ORG3, ORG4, ORG5, and ORG6). It is to be appreciated that data valuation results are obtained by combining cross-organization contributions from the matrix representation (e.g., values in the matrix 304 in FIG. 3), as explained above.

Figure 4:
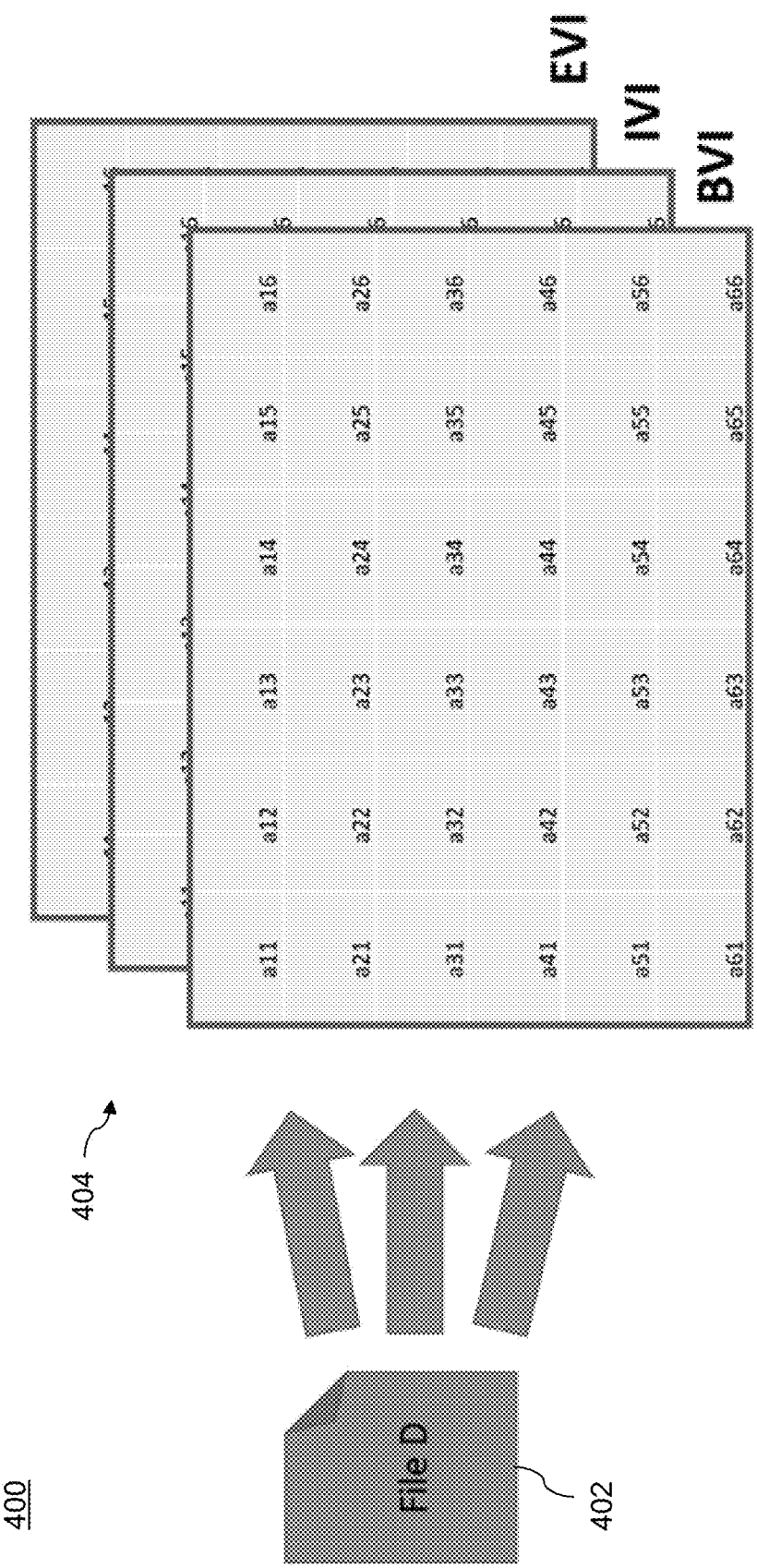
FIG. 4 illustrates an example of multiple file valuations, each represented in multi-dimensional model form, respectively calculated using multiple valuation techniques with which one or more illustrative embodiments can be implemented.

FIG. 4 illustrates an example 400 of multiple file valuations, each represented in multi-dimensional model form, respectively calculated using multiple valuation techniques with which one or more illustrative embodiments can be implemented. More particularly, FIG. 4 shows that for any given data set 402 (File D), the value of the data set 402 can be expressed as multiple matrices 404 (computed as illustratively explained above), wherein each matrix is calculated based on a different data valuation technique. In example 400, one matrix is constructed with values calculated using the above-referenced BVI model, one using the above-referenced IVI model, and another using the above-referenced EVI model.

While the use of multiple valuation algorithms (systems) provides the benefit of different points of view regarding the value of a given data set, it also raises challenges as will now be highlighted with some examples below.

Reconciling Valuation to Bottom Line Costs

Using different valuation systems for data presents a serious challenge of determining bottom line costs to the enterprise. Furthermore, costs and values of data are very dynamic and differ from business entity to business entity. There are no existing models for reconciling these costs to bottom line costs.

Accounting Security

A major deficiency in presenting these various valuation systems independent of bottom line costs is that there is no existing method for preventing an unscrupulous actor from manipulating original valuations or whatever method is used to convert valuations to bottom line business costs.

Currency Versus Non-Currency Values

Some values (EVI) are represented using currency (e.g., dollars), while other values (e.g., BVI) are not. Calculating an overall value based on these disparate representations is problematic to an organization.

Global Currencies

Organizations with data assets spread around the globe may all use disparate currencies (e.g., euros, dollars, yen, etc.) to measure value.

Automated Data Accounting

Data valuation using any model is expected to be dynamic through time. It would be desirable for an automated system (tied to data protection) to exist which accounts for the data values over time.

True Cost of Data

The true cost and value of data across all valuation systems should be grounded in the bottom line cost and value to the enterprise. The true value is dependent on many factors. It is therefore realized herein, in accordance with illustrative embodiments, that by utilizing a transaction-based common-valuation system based on supply and demand for the data over time, a realistic value can be assigned to the data.

No Automated Balancing for Multiple Valuation Methods

There are no existing methods based on transactional cost of data and multiple data value models which will automatically balance the data. Illustrative embodiments provide a mechanism by which any data asset can be automatically rebalanced.

No Learned Balancing

Automatic balancing of data assets based on bottom line business costs currently cannot be learned.

Global Auditability of Valuation and Data Movement

In addition to the complexities described above, placing a value on data and how it is subsequently being moved around a global enterprise is currently not trackable. There is no existing audit mechanism to answer questions such as: who valued which data when; and who moved the data based on its value.

Illustrative embodiments address the above and other drawbacks by providing techniques for normalized asset valuation and secure storage of information associated with such normalized asset valuation. To reiterate, while illustrative embodiments will be described below with respect to valuation of a data set, it is understood that alternative embodiments can be implemented for other assets (e.g., applications, services, etc.). Also, it is to be understood that while normalization techniques will be described herein in the context of multi-dimensional models (e.g., matrices), alternative embodiments can be implemented with any data valuation models (e.g., including normalization of single-value approaches).

Accordingly, one or more illustrative embodiments provide data valuation model normalization by converting the value or values in each data valuation model used to value a data set into a common value or values. In one illustrative embodiment, the common value is a cryptocurrency value. Examples of such cryptocurrencies include, but are not limited to, denominations referred to as "altcoins" which is short for "alternative coins" (such as alternatives to bitcoins, although one or more illustrative embodiments may utilize bitcoins as the common value(s)). Thus, as each data valuation algorithm generates one or more values for a given data set and then stores the values as transactions, illustrative embodiments provide for converting the one or more values into one or more altcoins for the storage transactions. Advantageously, this cryptocurrency represents a single, common value for valuing any transaction, factoring in a common currency regardless of the underlying valuation calculation unit (e.g., dollars, yen, efficiency, etc.).

Figure 5:
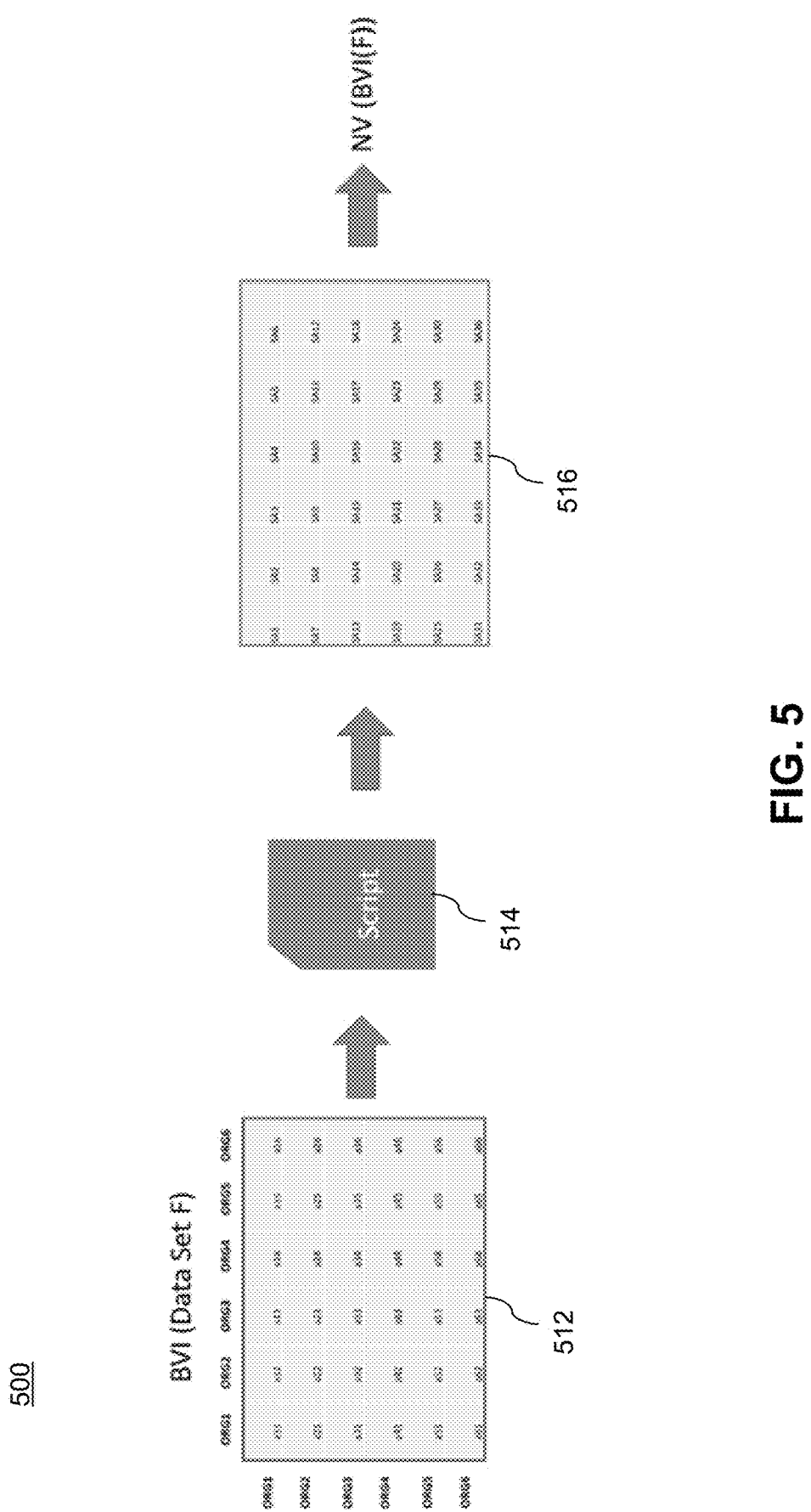
FIG. 5 illustrates a process for normalizing a data valuation model using scripted conversion, according to an illustrative embodiment.

In another illustrative embodiment, the cryptocurrency can be in the form of currency tokens referred to as "information technology bitcoins" (ITBs) as described in U.S.

patent application Ser. No. 15/487,684, entitled "Analytics Attestation Via Secure Data Chain Network" filed Apr. 14, 2017, the disclosure of which is incorporated by reference herein in its entirety By way of example, FIG. 5 illustrates a process 500 for normalizing a data valuation model using scripted conversion, according to an illustrative embodiment. Process 500 can be implemented as part of valuation framework 120 (FIG. 1). As shown in process 500, a matrix 512 computed for a Data Set F using the above-referenced BVI model is converted using a script 514 into a normalized matrix 516. That is, each value from the original matrix 512 (a11, a12, a13, . . . , a66) is converted by the script 514 into a corresponding storage altcoin, i.e., a11 converts to SA1, a12 converts to SA2, a13 converts to SA3, and so on through a66 converting to SA36. While this illustrative embodiment shows the script 514 converting on a per-matrix basis, alternative embodiments provide for conversion based on a per-row, a per-column, a per-cell basis, or combinations thereof.

Also, it is to be understood that the conversion of values into altcoins by script 514 can be performed in a number of ways. In one example, a conversion map is predetermined and accessed by the script 514 such that, given the value in the original matrix, a corresponding altcoin value is assigned. The conversion can be a scaled or weighted factor or some other conversion metric. Regardless of what valuation model was used to compute it, each original matrix is subject to a script such that values in each matrix are converted to corresponding altcoin values.

In accordance with illustrative embodiments, once the matrices are normalized into a common cryptocurrency form (e.g., an altcoin matrix) using one or more scripts, an overall value is calculated by using an equation that combines multiple normalized values. The equation below represents the normalized values of three matrices computed for Data Set F and includes one normalized term NV(BVI(F)) for the matrix computed for Data Set F using the BVI model, one normalized term NV(IVI(F)) for the matrix computed for Data Set F using the IVI model, and one normalized term NV(EVI(F)) for the matrix computed for Data Set F using the EVI model. The normalized values for each matrix are then combined into a single normalized value NV(F) for the Data Set F as shown:

$$NV(BVI(F))+NV(IVI(F))+NV(EVI(F))=NV(F)$$

Note that while addition is used as an example in the equation above, other operators (e.g., multiplication, weighting, etc.) can be used as well.

For any given point in time, multiple matrices can be generated and converted into altcoin values by one or more scripts. In one or more illustrative embodiments, the scripts and the matrices can be persisted in a protected storage system (e.g., an object store). They can be further preserved by being stored to a system that has retention capabilities. The scripts and the matrices can also be hashed and assigned unique identifiers (IDs).

Figure 6:
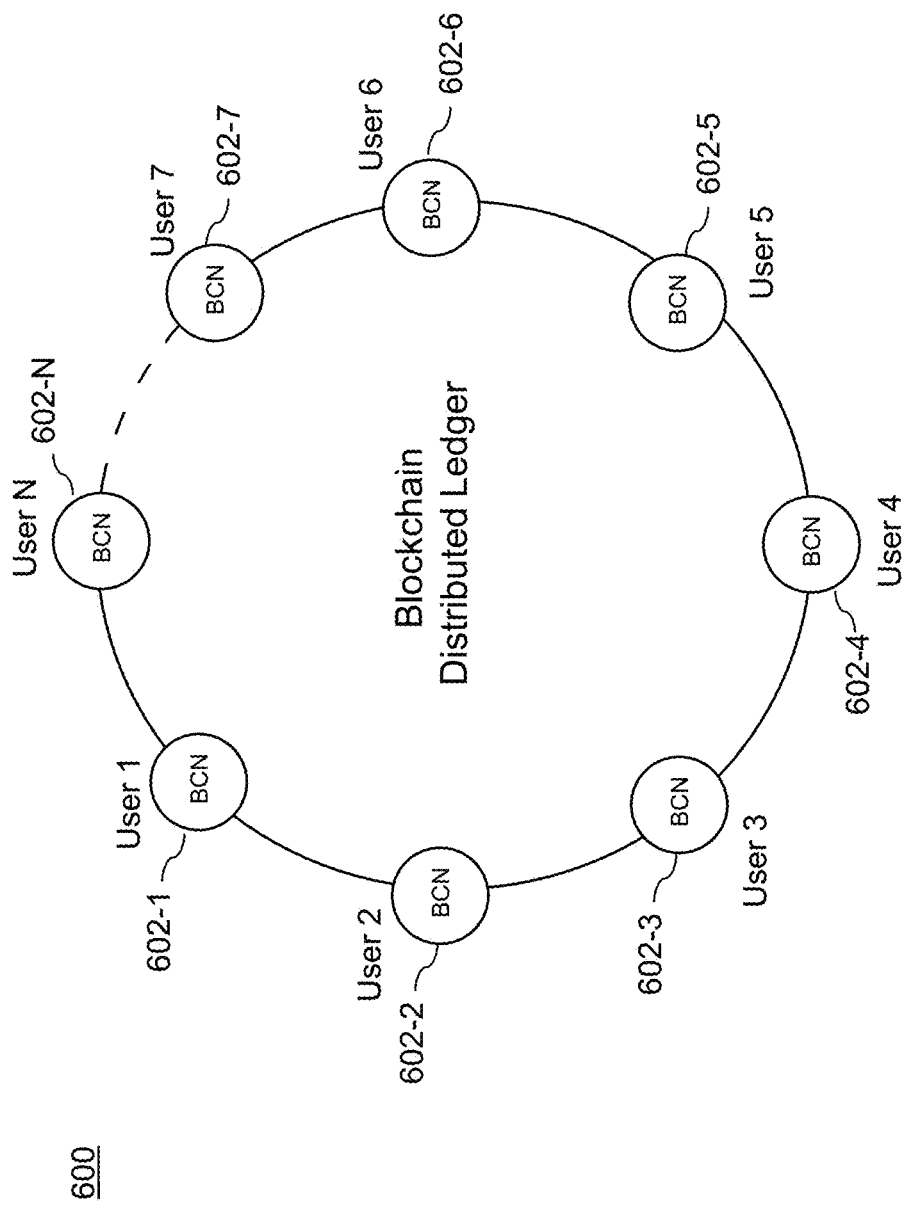
FIG. 6 illustrates a blockchain distributed ledger system with which one or more illustrative embodiments can be implemented.

By way of example only, in one illustrative embodiment, the storage system may comprise a blockchain distributed ledger system. Such a blockchain distributed ledger system may be part of valuation framework 120 (FIG. 1). More particularly, FIG. 6 illustrates a blockchain distributed ledger system 600, according to an illustrative embodiment. As generally illustrated, a plurality of blockchain nodes (BCNs), labeled 602-1, 602-2, 602-3, 602-4, 602-5, 602-6, 602-7, . . . , 602-N, are operatively coupled to form a distributed ledger system. Each BCN has a user associated therewith, i.e., User 1, User 2, User 3, User 4, User 5, User 6, User 7, . . . , User N. More than one user may be associated with a single BCN, and more than one BCN can be associated with a single user. For example, in the context of an enterprise, a user may be any entity associated with the enterprise that generates data valuation information and/or has a need to access data valuation information.

As used herein, the terms "blockchain," "ledger," "distributed ledger," and "blockchain distributed ledger" may be used interchangeably. As is known, the blockchain distributed ledger protocol is implemented via a distributed, decentralized computer network of compute nodes (e.g., BCNs 602-1, 602-2, 602-3, 602-4, 602-5, 602-6, 602-7, . . . , 602-N). The compute nodes are operatively coupled in a peer-to-peer communications protocol (e.g., as illustratively depicted as system 600 in in FIG. 6). In the computer network, each compute node is configured to maintain a blockchain which is a cryptographically secured record or ledger of data blocks that represent respective transactions within a given computational environment. The blockchain is secured through use of a cryptographic function, e.g., a hash function. A hash function is a cryptographic function which takes an input (or "message") and returns a fixed-size alphanumeric string, which is called the hash value (also a message digest, a digital fingerprint, a digest, or a checksum). Other cryptographic functions can be employed.

Each blockchain is thus a growing list of data records hardened against tampering and revision, and each block typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In some illustrative embodiments, a blockchain distributed ledger may be a bitcoin implementation wherein the blockchain contains a record, created via the bitcoin protocol, of all previous transactions that have occurred in the bitcoin network. The bitcoin protocol was first described in S. Nakamoto, "Bitcoin: A Peer to Peer Electronic Cash System," 2008, the disclosure of which is incorporated by reference herein in its entirety. However, in one or more illustrative embodiments, the blockchain distributed ledger system 600 is configured to securely store altcoins or any common form of crytocurrency and valuation information associated therewith.

A key principle of the blockchain is that it is trusted. That is, it is critical to know that data in the blockchain has not been tampered with by any of the compute nodes in the computer network (or any other node or party). For this reason, a hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

Further, it is to be appreciated that blockchain protocols, bitcoin or otherwise, may form a consensus network whereby a transaction is only added to the blockchain when validated by a consensus of BCNs 602-1, 602-2, 602-3, 602-4, 602-5, 602-6, 602-7, . . . , 602-N. In one example consensus network, each BCN is configured to participate in a consensus protocol as a peer with one peer being designated as a leader. Any peer can assume the role of leader for a given iteration of the consensus protocol. In general, the leader receives transactions from the participating peers in the system and creates a new block for the new transaction. The new block is sent out by the leader node to one or more of the other peer nodes which double check (validate) that the leader computed the new block properly (i.e., the validating nodes agree by consensus). There are other consensus protocols that can be used, and the above-mentioned one is merely an example.

If consensus is reached, then each BCN adds the new block to the blockchain they currently maintain. As a result, after a new transaction is processed by the system 600, each BCN should now have a copy of the same updated blockchain stored in its memory. Then, when a new transaction comes into the system 600, the above-described process of adding the transaction to the blockchain is repeated. It is to be understood that any single BCN may itself serve as the receiver, validator, and block generator for of a new transaction. However, in the context of a consensus protocol, the more BCNs that validate the given transaction, the more trustworthy the data block is considered.

It is to be appreciated that the above descriptions represent illustrative implementations of blockchain and consensus protocols and that embodiments of the invention are not limited to the above or any particular blockchain or consensus protocol implementation. As such, other appropriate processes may be used to securely maintain and add to a set of data in accordance with embodiments of the invention. For example, distributed ledgers such as, but not limited to, R3 Corda, Ethereum, and Hyperledger may be employed in illustrative embodiments.

Given the illustrative description of various features of a blockchain distributed ledger, illustrative embodiments provide for storing any valuation activity into any local node that is participating in an enterprise-wide blockchain, i.e., one of the BCNs 602-1, 602-2, 602-3, 602-4, 602-5, 602-6, 602-7, . . . , 602-N.

Figure 7:
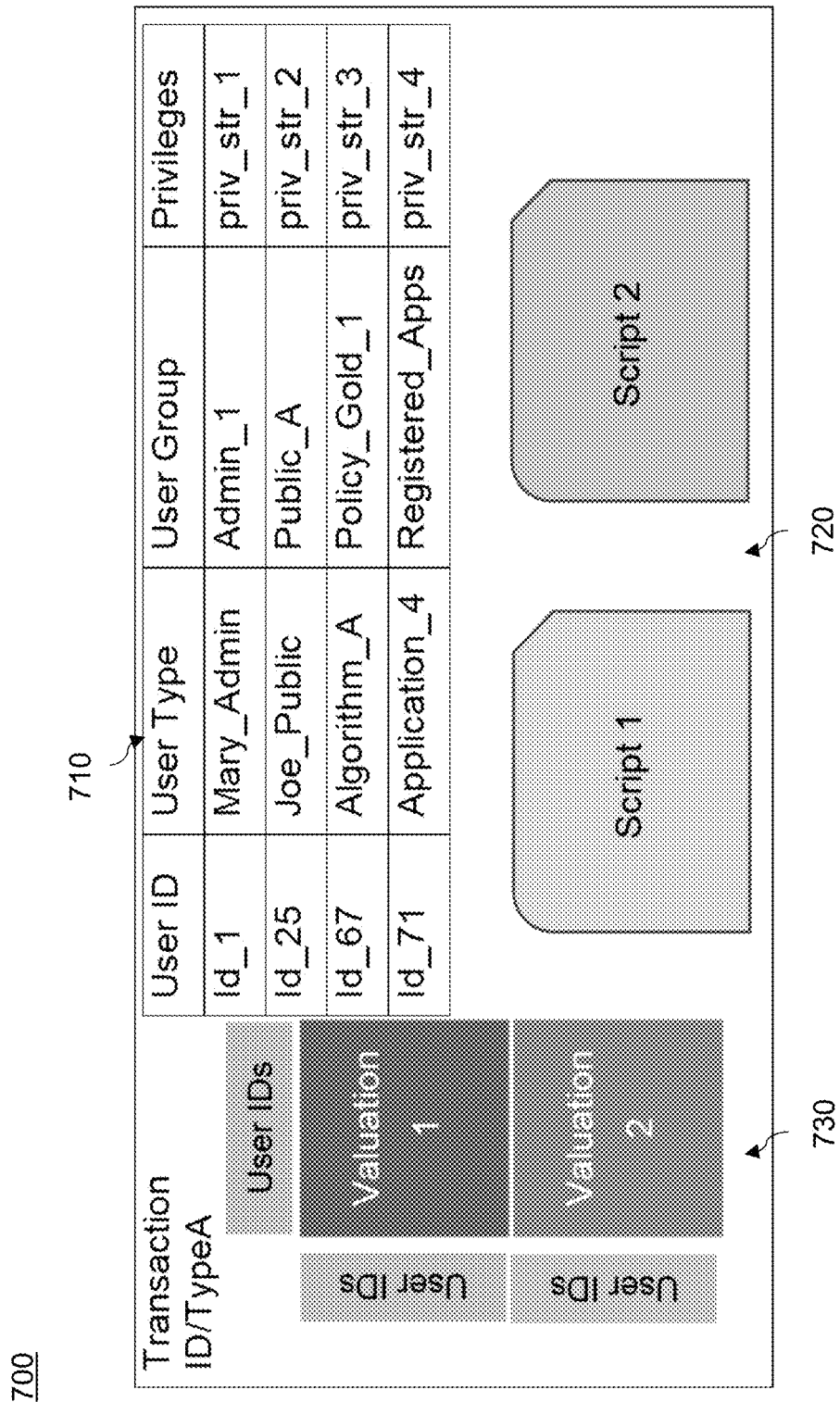
FIG. 7 illustrates an example of data valuation information storable as one or more transactions in a blockchain distributed ledger system, according to an illustrative embodiment.

Consider FIG. 7 which illustrates an example 700 of data valuation information storable as one or more transactions in a blockchain distributed ledger system (e.g., system 600 in FIG. 6), according to an illustrative embodiment. As shown, the information in one or more transactions comprises: information 710 representing a list of users or algorithms from different organizations used to generate valuation matrices; information 720 representing a number of different scripts used to normalize (and potentially summarize) original matrices to a common storage altcoin form; and information 730 representing the original valuation matrices, the transformed (altcoin) valuation matrices, or both.

The entire transaction depicted in FIG. 7 can be stored onto a blockchain distributed ledger system 600. Alternatively, the entire set of valuation activity depicted in FIG. 7 can be given a content address (e.g., apply a hash function to the information and generate a unique content-dependent identifier). This content address can subsequently be stored on the blockchain distributed ledger system 600 as a valuation transaction.

Accordingly, blockchain nodes across the enterprise and around the world in the case of a global enterprise (e.g., BCNs 602-1, 602-2, 602-3, 602-4, 602-5, 602-6, 602-7, . . . , 602-N as shown in FIG. 6) can then validate the valuation transaction as legitimate (or not) and add it to (or reject it from) the blockchain ledger, as explained above. Reasons for rejection may include, but are not limited to, invalid scripts, invalid users, etc.

Figure 8:
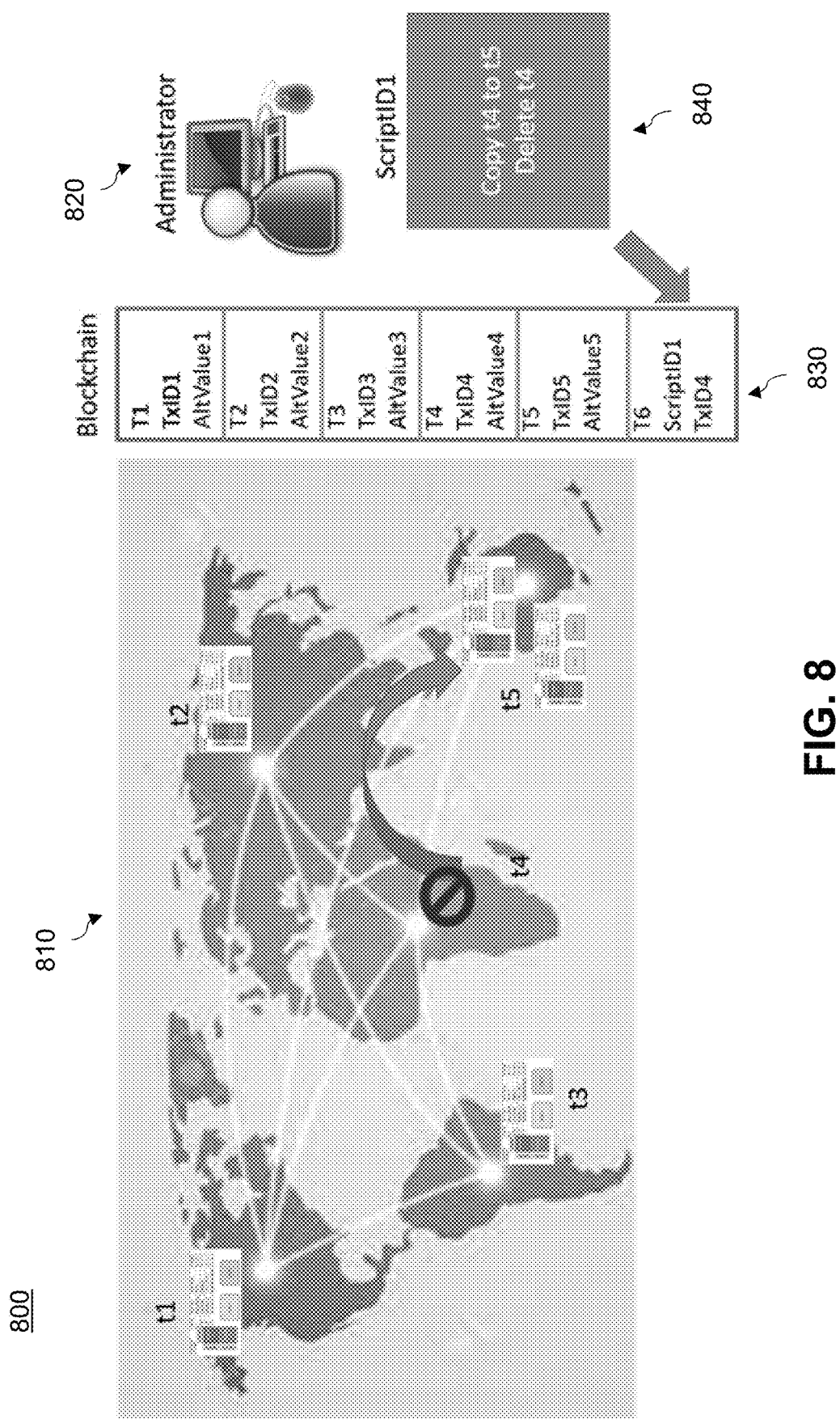
FIG. 8 illustrates a process of data movement based on valuation and recordation on a blockchain distributed ledger system, according to an illustrative embodiment.

Given that every entry into a blockchain ledger is replicated across all nodes (BCNs 602-1, 602-2, 602-3, 602-4, 602-5, 602-6, 602-7, . . . , 602-N as shown in FIG. 6), an administrator can view the normalized, cryptocurrency values of all data across the enterprise. Such a visualization is depicted in FIG. 8. More particularly, FIG. 8 illustrates a process 800 of data movement based on valuation and recordation on a blockchain distributed ledger system. Note that the BCNs are depicted in view 810 by the interconnected white dots. As such, an administrator 820 is given the ability to traverse a list of blockchain entries 830 (e.g., time, pointer to valuation transaction, and altcoin valuation) and obtain a portfolio-wide view (e.g., 810) of how multiple valuation models are being applied against enterprise data (as illustrated by the graphic of FIG. 7 next to certain ones of the BCNs in view 810). Each entry is also signed by the administrator 820 that performed the valuation.

Given that the administrator 820 has an enterprise-wide, normalized view of all matrices and values, the administrator 820 is in a unique position to decide to move or copy data assets in order to increase value, decrease costs, and reduce risks. As administrator 820 makes decisions based on the permanently-recorded blockchain entries, he can initiate data movement operations based on those entries, and record his decision (and the script used to move the data, e.g., 840 in FIG. 8) on the blockchain ledger 830. FIG. 8 highlights this data movement operation in view 810 and the subsequent entry on the blockchain ledger 830.

More particularly, in this example, it is assumed that the administrator 820 has viewed the valuation activity occurring in Africa, and based on that transaction (recorded at time t4 and recorded in blockchain entries 830 as transaction content-address TxID4), the administrator 820 executed "ScriptID1" 840. Upon completion of the move and delete, the data movement transaction is appended to the blockchain entries 830.

Typical blockchain implementations build security directly into the blockchain. In illustrative embodiments, the cryptographic properties are maintained to protect the transactions from tampering and other security breaches. The blockchain acts as a ledger of all transactions performed on a data item. The blockchain system is also tracking the user IDs of every party that performs a writable transaction on that data. In this way, all parties can be advised of any critical breaches or unauthorized transaction or transaction attempts. In addition, all valuation and data movement activities can be audited via examination of the ledger.

As administrators continually make data movement decisions based on observing global data valuation patterns, one or more machine learning algorithms (e.g., executed in one or more of the BCNs 602-1, 602-2, 602-3, 602-4, 602-5, 602-6, 602-7, . . . , 602-N, as shown in FIG. 6) can begin to recommend that certain scripts be automatically executed when certain valuation patterns are observed. These recommendations can be entered into the valuation transaction, where they can be manually approved and executed. As such, multiple data sets can be automatically balanced across an enterprise. In one illustrative embodiment, such balancing comprises content storage balancing whereby given data sets are stored at (and/or migrated to) different storage locations based on the valuation information stored on the distributed ledger system. For example, an enterprise can pre-establish a content balancing criterion (e.g., one or more of cost, convenience, security, compliance, etc.) to enable storage location selection. Selection can be manual, automated, or a combination thereof.

Figure 9:
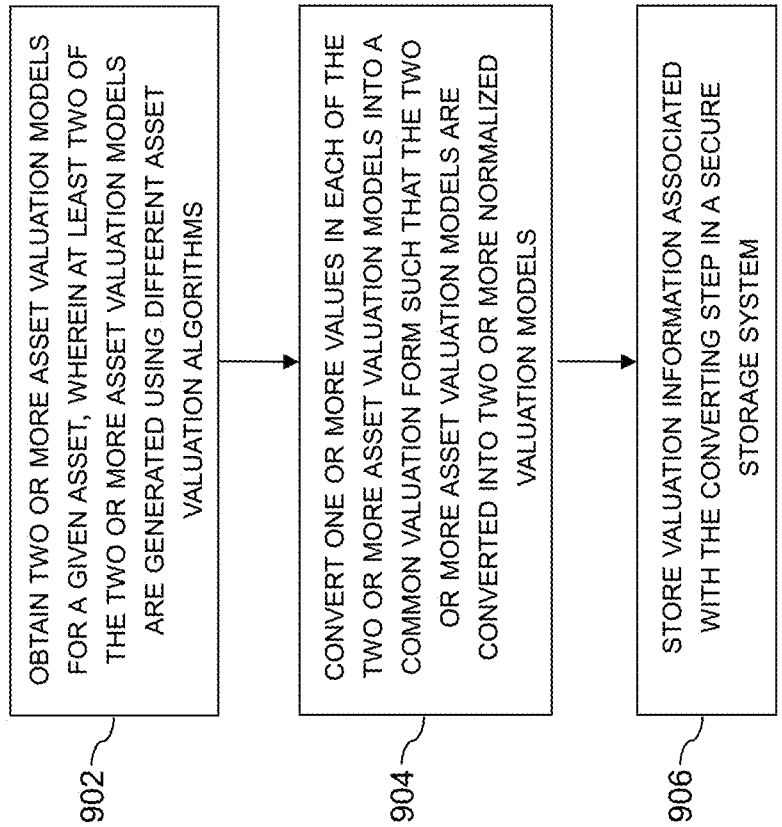
FIG. 9 illustrates a data valuation normalization and secure storage methodology, according to an illustrative embodiment.

FIG. 9 illustrates a data valuation normalization and secure storage methodology, according to an illustrative embodiment. As shown in methodology 900, step 902 obtains two or more asset valuation models for a given asset, wherein at least two of the two or more asset valuation models are generated using different asset valuation algorithms. Step 904 converts one or more values in each of the two or more asset valuation models into a common valuation form such that the two or more asset valuation models are converted into two or more normalized valuation models. Step 906 stores valuation information associated with the converting step in a secure storage system.

At least portions of the data valuation frameworks shown in FIGS. 1-9 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors.

As is apparent from the above, one or more of the processing modules or other components of the data valuation frameworks shown in FIGS. 1-9 may each run on a computer, server, storage device or other processing platform element. A given such element may be viewed as an example of what is more generally referred to herein as a "processing device." An example of such a processing platform is processing platform 1000 shown in FIG. 10.

The processing platform 1000 in this embodiment comprises a plurality of processing devices, denoted 1002-1, 1002-2, 1002-3, . . . 1002-N, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 10:
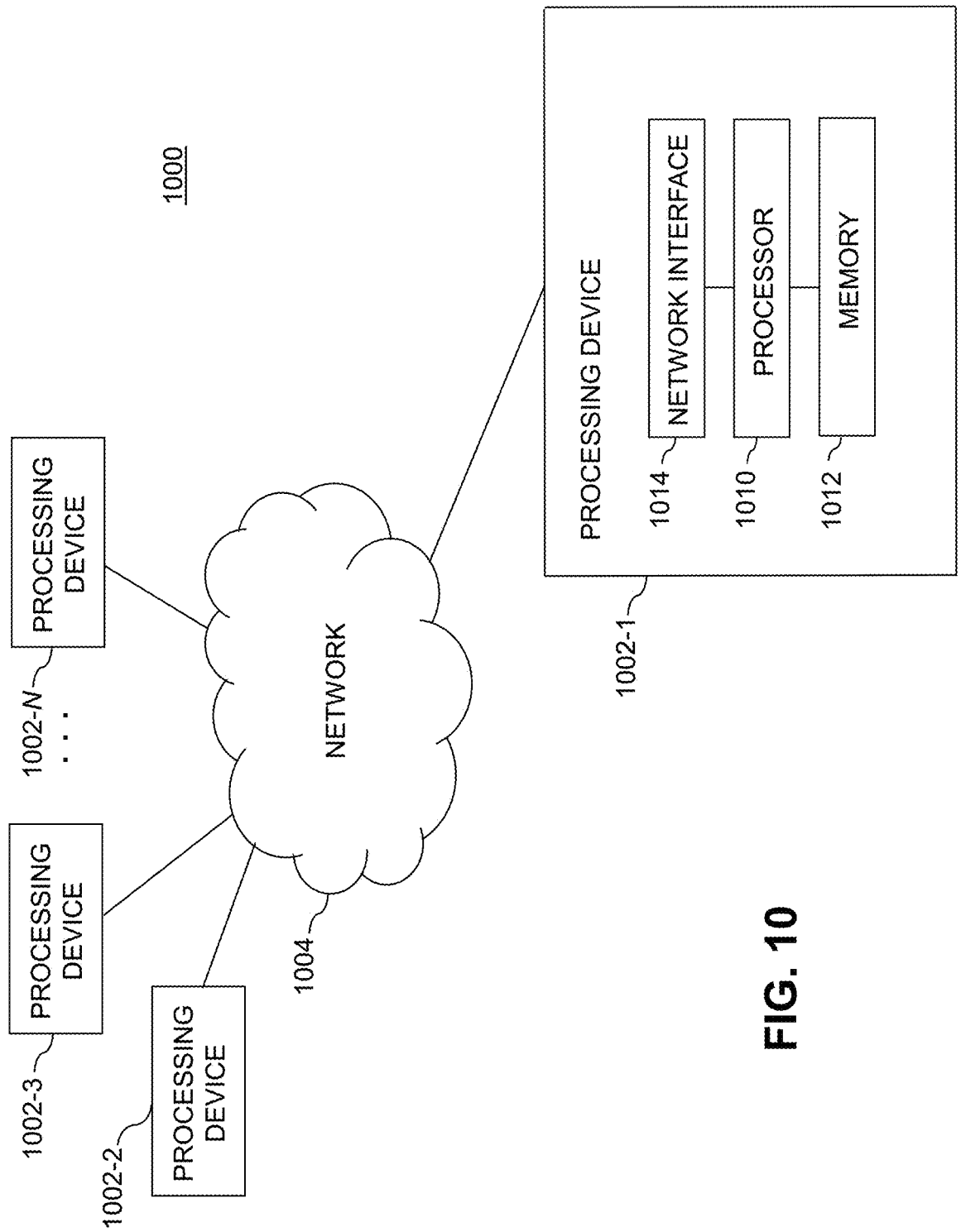
FIG. 10 illustrates a processing platform used to implement a data valuation framework with data valuation normalization and secure storage, according to an illustrative embodiment.

Also included in the processing device 1002-1 of the example embodiment of FIG. 10 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a data valuation frameworks of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system and methods described herein. Such components can communicate with other elements of the system over any type of network or other communication media.

As indicated previously, in some embodiments, components of the data valuation frameworks as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems and assets. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   obtaining two or more asset valuation models for at least one given asset, wherein the two or more asset valuation models are generated using different asset valuation algorithms;
   converting one or more values in each of the two or more asset valuation models into a common valuation form such that the two or more asset valuation models are converted into two or more normalized valuation models;
   storing valuation information associated with the converting step in a distributed ledger system storage system;
   automatically initiating an asset movement operation based on the valuation information stored in the distributed ledger system such that the given asset is migrated from a first storage location to at least a second storage location of an enterprise; and
   enabling one or more machine learning algorithms to make one or more recommendations for automatic execution of one or more asset movement scripts based on an asset valuation pattern determined from the valuation information stored in the distributed ledger system;
   wherein the first storage location and the second storage location communicate through one or more networks associated with the enterprise;
   wherein each of the two or more asset valuation models is in the form of a multi-dimensional model configured to generate cross-group impact values with respect to the given asset and two or more groups associated with the given asset;
   wherein generating the cross-group impact values comprises determining network latency of the one or more networks through which the first and second storage locations communicate; and
   wherein the steps are performed by one or more processing devices, each processing device comprising a processor and a memory.

2. The method of claim 1, wherein the common valuation form comprises a form of cryptocurrency.

3. The method of claim 1, further comprising combining the two or more normalized valuation models to form a single normalized valuation for the given asset.

4. The method of claim 1, wherein the converting step further comprises utilizing at least one conversion script to convert the two or more asset valuation models into the two or more normalized valuation models.

5. The method of claim 1, wherein the converting step further comprises utilizing two or more different conversion scripts to convert the two or more asset valuation models into the two or more normalized valuation models.

6. The method of claim 1, wherein the information stored on the distributed ledger system comprises information representing one or more of: the two or more asset valuation models; the two or more asset normalized valuation models; at least one conversion script used to perform the converting step; and one or more users of the distributed ledger system.

7. The method of claim 1, wherein the information stored on the distributed ledger system comprises one or more content addresses computed for information representing one or more of: the two or more asset valuation models; the two or more asset normalized valuation models; at least one conversion script used to perform the converting step; and one or more users of the distributed ledger system.

8. The method of claim 1, wherein the distributed ledger system provides an administrator with a system-wide view of valuation information stored on the distributed ledger system for the given asset.

9. The method of claim 1, further comprising storing information associated with the asset movement operation on the distributed ledger system.

10. The method of claim 1, wherein the distributed ledger system provides an auditable record of valuation information stored thereon.

11. The method of claim 1, wherein the given asset comprises a data set.

12. The method of claim 11, further comprising storing the data set at a given storage location, wherein the given storage location is selected based on a content balancing criterion.

13. The method of claim 12, wherein the storage location selection is one or more of manual and automated.

14. An article of manufacture comprising a non-transitory processor-readable storage medium having encoded therein executable code of one or more software programs, wherein the one or more software programs when executed by one or more processing devices implement steps of:

obtaining two or more asset valuation models for a given asset, wherein the two or more asset valuation models are generated using different asset valuation algorithms;

converting one or more values in each of the two or more asset valuation models into a common valuation form such that the two or more asset valuation models are converted into two or more normalized valuation models;

storing valuation information associated with the converting step in a distributed ledger system storage system;

automatically initiating an asset movement operation based on the valuation information stored in the distributed ledger system such that the given asset is migrated from a first storage location to at least a second storage location of an enterprise; and enabling one or more machine learning algorithms to make one or more recommendations for automatic execution of one or more asset movement scripts based on an asset valuation pattern determined from the valuation information stored in the distributed ledger system;

wherein the first storage location and the second storage location communicate through one or more networks associated with the enterprise;

wherein each of the two or more asset valuation models is in the form of a multi-dimensional model configured to generate cross-group impact values with respect to the given asset and two or more groups associated with the given asset; and wherein generating the cross-group impact values comprises determining network latency of the one or more networks through which the first and second storage locations communicate.

15. A system comprising:

one or more processors operatively coupled to one or more memories configured to:

obtain two or more asset valuation models for a given asset, wherein the two or more asset valuation models are generated using different asset valuation algorithms; and convert one or more values in each of the two or more asset valuation models into a common valuation form such that the two or more asset valuation models are converted into two or more normalized valuation models;

store valuation information associated with the converting step in a distributed ledger system storage system;

automatically initiate an asset movement operation based on the valuation information stored in the distributed ledger system such that the given asset is migrated from a first storage location to at least a second storage location of an enterprise; and enable one or more machine learning algorithms to make one or more recommendations for automatic execution of one or more asset movement scripts based on an asset valuation pattern determined from the valuation information stored in the distributed ledger system;

wherein the first storage location and the second storage location communicate through one or more networks associated with the enterprise;

wherein each of the two or more asset valuation models is in the form of a multi-dimensional model configured to generate cross-group impact values with respect to the given asset and two or more groups associated with the given asset; and wherein generating the cross-group impact values comprises determining network latency of the one or more networks through which the first and second storage locations communicate.

16. The method of claim 11 wherein the given asset comprises multiple data sets and wherein enabling one or more machine learning algorithms to make one or more recommendations for automatic execution comprises automatically balancing the multiple data sets across an enterprise.

17. The method of claim 13 wherein the storage location selection is automated.

18. The article of manufacture of claim 14 wherein the given asset comprises multiple data sets and wherein enabling one or more machine learning algorithms to make one or more recommendations for automatic execution comprises automatically balancing the multiple data sets across an enterprise.

19. The system of claim 15 wherein the given asset comprises multiple data sets and wherein enabling one or more machine learning algorithms to make one or more recommendations for automatic execution comprises automatically balancing the multiple data sets across an enterprise.

20. The method of claim 1, further comprising utilizing a value representative of the network latency in generating the cross-group impact values.

* * * * *